No. 846,056. PATENTED MAR. 5, 1907.
H. W. SANFORD.
AXLE LUBRICATING MECHANISM.
APPLICATION FILED JAN. 3, 1907.
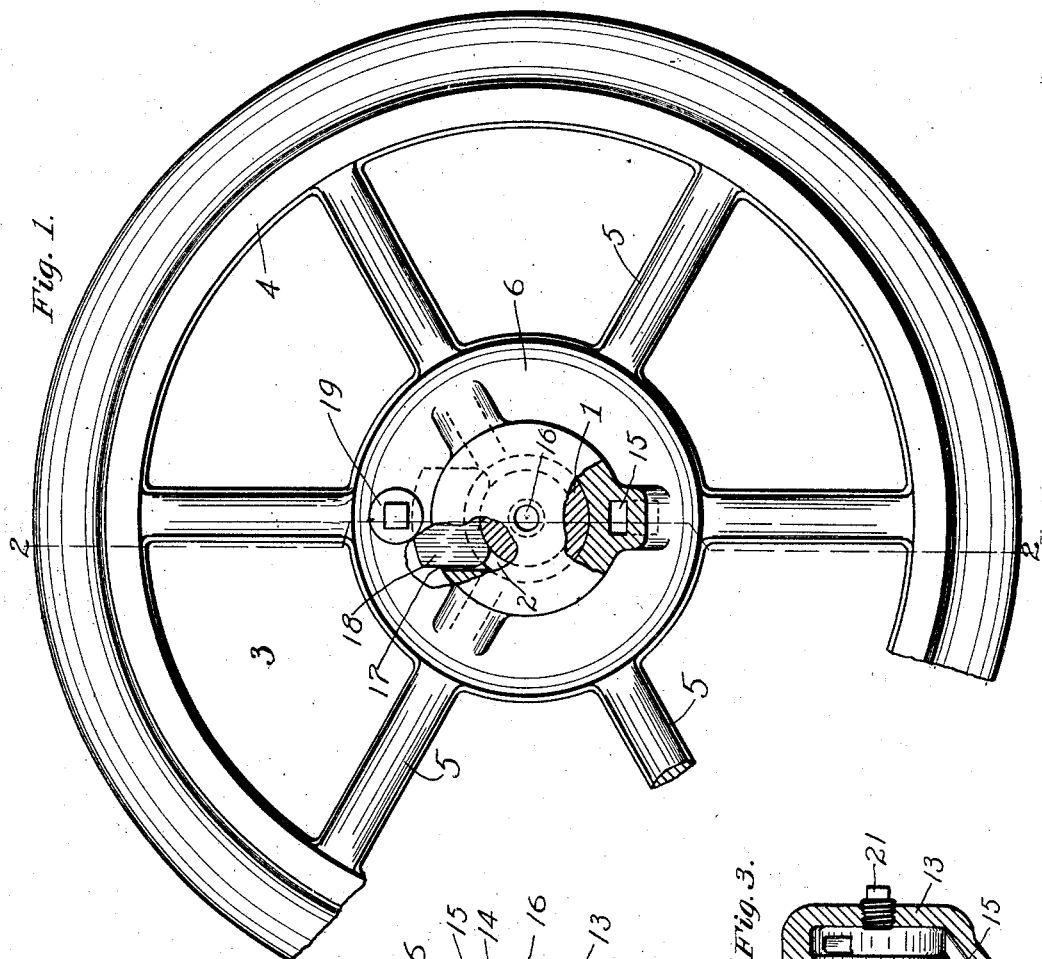
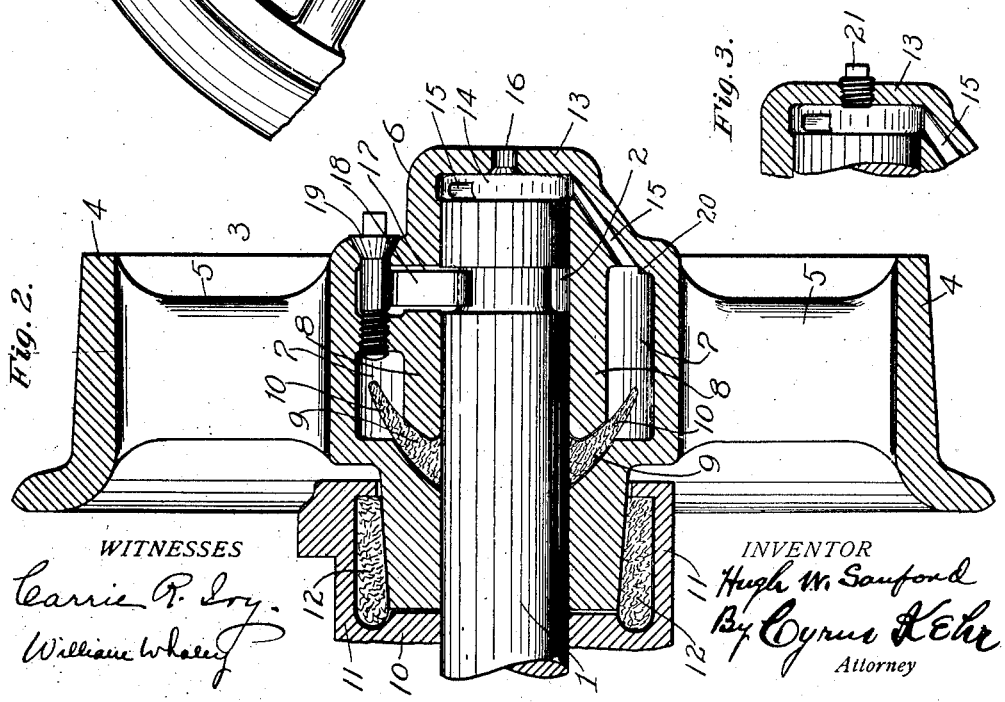
WITNESSES
Carrie R. Ivy.
William Whaley
INVENTOR
Hugh W. Sanford
By Cyrus Kehr
Attorney

UNITED STATES PATENT OFFICE.

HUGH W. SANFORD, OF KNOXVILLE, TENNESSEE.

AXLE-LUBRICATING MECHANISM.

No. 846,056. Specification of Letters Patent. Patented March 5, 1907.

Application filed January 3, 1907. Serial No. 350,644.

*To all whom it may concern:*

Be it known that I, HUGH W. SANFORD, a citizen of the United States, residing at Knoxville, in the county of Knox and State of Tennessee, have invented a new and useful Improvement in Axle-Lubricating Mechanism, of which the following is a specification, reference being had to the accompanying drawing.
My improvement relates generally to axle-lubricating mechanism, and is particularly applicable to vehicles in which the wheels rotate on the axles. Mine-cars are usually of this type, and the application of the improvement to a wheel and axle of such a car is hereinafter described.

The object of the invention is to produce a car-wheel which may be easily and cheaply manufactured and which will contain efficient and convenient means for the lubrication of the portion of the axle which extends into the hub surrounding the axle.

In the accompanying drawings, Figure 1 is an elevation of the outer or front side of a structure embodying my improvement, portions of the wheel forming a part of the structure being broken away. Fig. 2 is a section on the line 2 2 of Fig. 1. Fig. 3 is a sectional detail of a modification of the outer or front end of the hub.

For convenience in description, the side or portion of the wheel directed away from the car will be herein designated the "front" side or portion, while the opposite side or portion will be termed the "rear" side or portion.

In the particular form of the structure shown by said drawings, 1 is one end of a car-axle which is secured to a car. An annular locking-groove 2 is formed into the axle near the end of the latter to receive a key-block, as will be hereinafter described. The axle has a bearing-face at each side of said locking-groove, and the hub bears on each of said faces.

The wheel 3 has a rim 4, spokes 5, and a hub 6. Between its ends the hub is thickened and has in said thickened portion a relatively large annular oil chamber or reservoir 7, approximately concentric with the hub-axis, such reservoir being separated from the axle 1 by means of a wall 8. From points adjacent said reservoir and rearward of the locking-groove and distributed approximately equidistant from each other around the axle ducts 9 extend from the bore of the hub into said reservoir. Said reservoir is preferably broadened in a direction parallel to the axle 1 and said ducts 9 made to enter the rear portion of said reservoir. At its rear said hub is extended a suitable distance to enter a packing-box 11, containing packing 12 for preventing the passage of oil and dust. At its opposite end the hub extends continuously over or across the adjacent end of the axle, forming a wall 13, standing at a short distance away from said end of the axle and leaving a passage 14. From said passage three relatively small ducts 15 extend obliquely and radially outward away from the axial line of the hub into the front portion of the oil-reservoir 7, said ducts being approximately equally distributed around the hub axis. On the axial line of the hub a port 16 extends through said wall 13, said port being of proper size to receive the nozzle or discharge end of an oil-can for introducing oil into the passage 14, said space being preferably only sufficient to permit the downward flow of the oil issuing from the nozzle of an oil-can inserted into said port. The three ducts 15 shown by the drawings being distributed equidistant around the hub-axis, at least one of said ducts is always located below the level of the port 16 in position to permit the oil to flow by gravity downward from the port 16 through such duct 15 into the lower front portion of the oil chamber or reservoir 7.

Opposite the groove 2 the hub has a recess 17 large enough to receive all of a key-block 18, which is adapted to extend into the annular locking-groove 2. A screw bolt or plug 19 extends through the wall of the hub at each side of said chamber parallel to the hub-axis and through said chamber between said key-block and the outer wall of the hub and holds said key-block in said groove. When the wheel is to be detached, said screw-bolt is removed and the key-block 18 allowed to fall completely into the recess 17 when the wheel has been so turned as to bring said recess beneath the axle. Then the wheel is free for removal. The various portions of said hub constitute a one-piece casting.

In operation oil is introduced through the port 16 by inserting the nozzle or spout of an oil-can into said port. A portion of the oil so introduced spreads through the passage 14 to the end of the axle and over the bearing-face of the axle, which is located in front of the locking-groove, and the remainder of said oil flows through the oblique duct or ducts 15 at the time below said port into the lower forward portion of the annular reservoir 7, as already described. Said reservoir is large enough to contain a sufficient quantity of oil to lubricate said axle a relatively long time. A piece of absorbent material 10 rests in each passage 9 and extends into the annular reservoir. When one of the passages 9 is beneath the axle, its piece of absorbent material extends into the oil and by capillary attraction carries oil to the portion of the axle located rearward of the locking-groove. Furthermore, with the rotation of the hub oil is carried upward on the faces of the reservoir and a portion thereof made to flow upon the pieces of absorbent material 10 and into the passages or ducts 9 when the latter are above the axle. Said pieces of absorbent material may be omitted.

To reduce the tendency of the oil to flow into the ducts 15 when the latter are above the axle, each duct is made to enter the reservoir 7 at a little distance away from the curved walls of said reservoir, and the portion or lip 20 of the upright wall between said outer curved wall and the adjacent end of the duct 15 is placed rearward of the portion of said upright wall between the end of said duct and the axle, so that oil dripping from said lip 20 will pass the entrance to the duct 15 and fall upon the inner curved face of the reservoir 7.

The port 16, the passage 14, and the ducts 15 may be regarded as a spider-form group of ducts leading from the front exterior of the hub to the reservoir 7 for conducting oil into said reservoir, and it is to be noted that said ducts lead the oil into said reservoir from a point in front of the locking-groove, while the reservoir discharges rearward of said groove. At the same time an ample supply of oil is received directly from the passage 14 by the portion of the axle in front of the locking-groove.

In Figs. 1 and 2 the port 16 is open. This may be left so in actual use, if desired, for the oil-reservoir 7 is far enough removed from and its lower portion extends far enough below the level of said port to ordinarily prevent the discharge of oil through said port, even if the latter is open; but for the complete prevention of escape of oil and the ingress of dust said port may be closed by any well-known means, such as a screw-plug 21, as shown in Fig. 3, and it is to be observed that while the structure provides for the direct supply of oil to the axle-face at each side of the locking mechanism the structure is at the same time such as to permit the introduction of the oil without turning the wheel into a particular position and to prevent drainage of the oil when the oil-port is open.

I claim as my invention—

In a structure of the nature described, an axle having an annular locking-groove and a bearing-face at each side of said groove, a wheel having a hub presenting a bearing-face to said axle at each side of said locking-groove and having between its ends a reservoir communicating with the bore of the hub rearward of said locking-groove, and said hub extending around and over the end of said axle a short distance away from said end to form a passage, 14, and having a port opening into said passage, and having a duct forming communication between said passage and said reservoir, whereby provision is made for supplying oil to the faces of the axle at each side of the locking-groove, and locking means entering said locking-groove and engaging said hub, substantially as described.

In testimony whereof I have signed my name, in presence of two witnesses, this 29th day of December, in the year 1906.

HUGH W. SANFORD.

Witnesses:
 CYRUS KEHR,
 C. A. MORSE.